A. C. ALLEN.
Preserving Meat.
No. 4,754. Patented Sept. 12, 1846.
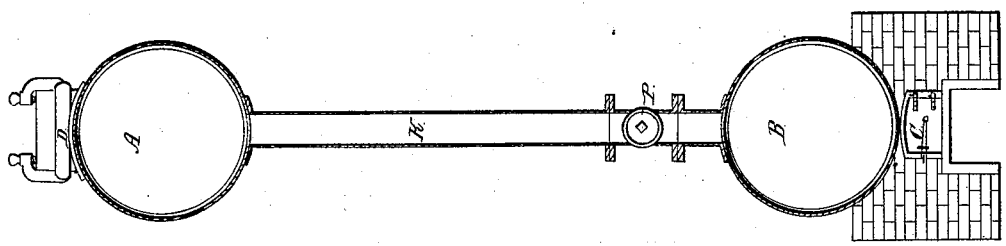
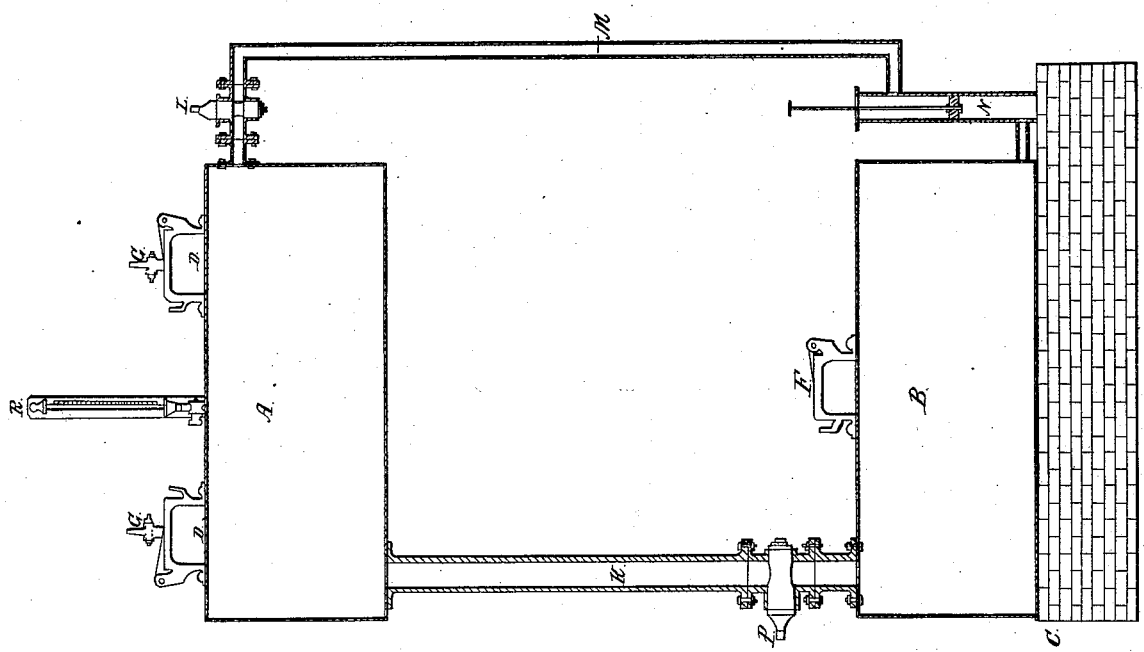

UNITED STATES PATENT OFFICE

AUGUSTUS C. ALLEN, OF HOUSTON, TEXAS.

IMPROVEMENT IN CURING MEAT, &c.

Specification forming part of Letters Patent No. 4,754, dated September 12, 1846.

*To all whom it may concern:*

Be it known that I, AUGUSTUS C. ALLEN, of Houston, State of Texas, have invented a new and Improved Mode of Curing Meat in Vacuum; and I do hereby declare that the following is a full and exact description of the same.

To enable others skilled in the art to make and use my invention, I will proceed to describe its construction and operations as follows:

A represents a meat-vat air-tight, made of iron, in which I put the meat to be operated upon.

B is an air-tight brine-vat, made of iron, under which there is a furnace C for heating and purifying the brine, which is to be infused into the meat when warm, as recent experiments have shown that meat will receive hot or warm brine much better than it will cold, and especially when the meat is in vacuum. The pores of the meat being opened to their utmost extension readily and most effectually receive the warm brine and cure the meat in a much shorter space of time than if it were cold.

N represents a pump attached to the brine-vat B, and M a pipe connecting pump N with meat-vat A, and L a stop-cock in pipe M, and K represents a pipe connecting vat B with vat A, and P a stop-cock in pipe K between vat B and vat A, and F represents a man-hole in brine-vat B, and D D represent man-holes in meat-vat A; G G, air-cocks in meat-vat A, and R a vacuum-gage.

I put the meat in vat A in layers on racks, keeping the layers a small distance apart, in order that the brine can freely circulate and the air freely pass out of the meat when subjected to vacuum. After having the vat thus filled with meat I open stop-cock L and close stop-cock P. I then fill brine-vat B and heat the brine to such a temperature as is desired. Then I close man-hole F in brine-vat B, and also close man-holes D D in meat-vat A. I then exhaust the warm brine from vat B into and fill vat A, (which warm brine has a tendency to expand the meat, and consequently opens its pores more effectually when subjected to a vacuum than if it were cold.) Then I close the air-cocks G G and stop-cock L. I then open stop-cock P and the brine runs from vat A into vat B, having created a vacuum in brine-vat B in exhausting it of brine into meat-vat A, thereby accelerating the discharge of brine from the meat-vat A, and thus create an almost instantaneous vacuum in vat A by filling up the vacuum created in brine-vat B, causing the gaseous matters to rush out of the meat which it naturally contains, and thus it is prepared to receive an impregnation from the warm brine. I again close stop-cock P and open stop-cock L and exhaust the brine from vat B into vat A until it is nearly filled or the meat covered with brine. I then open the air-cocks G G to permit the accumulated gases to pass off, and continue to exhaust the brine from vat B into and fill the vat A, and again close the air-cocks G G and stop-cock L. Then I open stop-cock P, allowing the brine again to run out of vat A into vat B, leaving the meat in vacuum. A repetition of this should be continued at intervals until the meat is sufficiently cured, which can be ascertained by the relative weight of the meat before and after it was subjected to the vacuum process. This sudden vacuum in the meat-vat, together with the application of hot or warm brine, is found to cure the meat much better and quicker than any known process. Hence operations need not be so often repeated, thus creating a great saving of labor.

The distance between the vats is not material.

It will be seen that one grand object by this process to be obtained is rapidly-produced vacuum, as it is much more effectual than one obtained by the ordinary and gradual means of air, lifting or suction pumps, for the reason that the pressure or weight of the air, as well as that of the brine, being so suddenly removed, causes the fibers of the meat to distend more effectually or the pores of the meat to open wider, and thus it is more readily impregnated with warm brine and in a shorter space of time than by any other known method, as recent experiments have abundantly proved; or, in other words, meat being an elastic substance, it seems to attain a greater expansion when the pressure is suddenly removed than if the pressure were taken off gradually, the opening of the pores being aided by the quick discharge of the air which is mechanically held in the meat.

What I claim as my invention, and desire to secure by Letters Patent, is—

The mode by which I obtain a vacuum in meat-vat A for curing meat by exhausting the brine from meat-vat A into brine-vat B, and by means of the combination of stop-cock P and pipe K, connecting vat A with vat B, and stop-cock L in pipe M, substantially as above described.

AUGUSTUS C. ALLEN.

Witnesses:
WILLIAM P. SAY,
JNO. S. SWAIN.